US010549167B2

(12) United States Patent
Moylen

(10) Patent No.: US 10,549,167 B2
(45) Date of Patent: Feb. 4, 2020

(54) SPORTS AWARENESS VEST

(71) Applicant: Vision Group, LLC, Littleton, CO (US)

(72) Inventor: Michael R. Moylen, Littleton, CO (US)

(73) Assignee: Vision Group, LLC, Littleton, CO (US)

( * ) Notice: Subject to any disclaimer, the term of this patent is extended or adjusted under 35 U.S.C. 154(b) by 0 days.

(21) Appl. No.: 16/025,770

(22) Filed: Jul. 2, 2018

(65) Prior Publication Data
US 2019/0001207 A1   Jan. 3, 2019

Related U.S. Application Data

(60) Provisional application No. 62/527,814, filed on Jun. 30, 2017.

(51) Int. Cl.
| | |
|---|---|
| *H05B 37/02* | (2006.01) |
| *A63B 69/00* | (2006.01) |
| *A41D 1/00* | (2018.01) |
| *A63B 24/00* | (2006.01) |
| *H04Q 9/00* | (2006.01) |
| *A41D 1/04* | (2006.01) |
| *A63B 102/24* | (2015.01) |
| *G09B 19/00* | (2006.01) |

(52) U.S. Cl.
CPC ............ *A63B 69/002* (2013.01); *A41D 1/002* (2013.01); *A41D 1/04* (2013.01); *A63B 24/0021* (2013.01); *A63B 69/0026* (2013.01); *H04Q 9/00* (2013.01); *H05B 37/0227* (2013.01); *H05B 37/0272* (2013.01); *A41D 2600/10* (2013.01); *A63B 2024/0025* (2013.01); *A63B 2102/24* (2015.10); *A63B 2207/02* (2013.01); *A63B 2225/50* (2013.01); *A63B 2243/007* (2013.01); *A63B 2243/0025* (2013.01); *G09B 19/00* (2013.01); *H04Q 2209/40* (2013.01)

(58) Field of Classification Search
CPC ............ H05B 37/0227; H05B 37/0245; H05B 37/0272; H05B 37/0281; A42B 3/044
USPC .................................................. 315/149, 152
See application file for complete search history.

(56) References Cited

U.S. PATENT DOCUMENTS

| | | | |
|---|---|---|---|
| 10,306,739 B2 * | 5/2019 | Recker ............... | H05B 33/0854 |
| 2017/0325532 A1 * | 11/2017 | Gerpheide ............... | G02B 6/00 |
| 2018/0055129 A1 * | 3/2018 | Harris .................... | A42B 3/044 |
| 2018/0151047 A1 * | 5/2018 | Brunner ................. | A61B 5/746 |

* cited by examiner

Primary Examiner — Tung X Le
(74) Attorney, Agent, or Firm — Sheridan Ross P.C.

(57) ABSTRACT

A system, device, and method are provided herein for remotely trigger a light on an awareness article. In some embodiments, the awareness article is a vest used by football players where a plurality of awareness vests are in electronic communication with an electronic device. A coach can control activation of the light on each awareness vest such that, for example, a quarterback can throw a football to the person wearing the awareness vest with the activated light. Various other aspects of the system, device, and method are described herein, and other applications of the awareness vest can include other sports such as soccer and hockey, dog training such as hunting and schutzhund, and military training such as war games, target practice, and enemy identification.

18 Claims, 3 Drawing Sheets

SPORTS AWARENESS VEST

CROSS REFERENCE TO RELATED APPLICATION

This application claims the benefit of U.S. Application Ser. No. 62/527,814, filed on Jun. 30, 2017, which is incorporated by reference in its entirety.

FIELD OF THE INVENTION

The present invention relates to an apparatus, system and method for increasing awareness of subjects participating in activities that require peripheral view awareness. In particular, the invention relates to controlling and presenting an indicator to human and non-human subjects for their response.

BACKGROUND OF THE INVENTION

Performance and success in many events depends on a subject's ability to visually recognize, discern, and act on information. In football and the National Football League (NFL), the quarterback is considered the most instrumental position to fill on the field. The quarterback's role initiates almost every play during a game. In addition, their ability to discern when and where to release the football on field can be one of the most valuable weapons for a team. An increase in proficiency of this ability would be desired by owners, coaches, and players at all levels of football. Further, in dog training, the ability to track game or identify game during a hunt is paramount. In the military, the ability to identify enemies, distinguish enemies from non-enemies, and then take appropriate action is critical to the safety and performance of the military member. Therefore, there is a need to train subjects such as quarterbacks, trainers, and military members to improve the speed and success rate of visually recognizing, discerning, and acting on information.

SUMMARY OF THE INVENTION

The present invention provides an apparatus, system and method for using an article of clothing that has at least one light to train a subject to visually recognize, discern, and act on information. For example, in the context of football, a Quarterback Awareness Vest (QAV) can have a light array that is in communication with an electronic device. Multiple QAVs can be worn by multiple subjects on the field, including receivers and running backs. When practicing a play, the light arrays on the QAVs can turn on to provide a signal to the quarterback so that the quarterback takes action.

The electronic device has the ability to trigger the light array of any particular subject at any time desired. The electronic device can be manually operated or automatically operated with preset routines such as football plays. During operation, the electronic device can trigger the light array of a wide receiver when the wide receiver is at a predetermined location on his route, and the quarterback would then be required to distribute the ball to the wide receiver with the triggered light array. The present invention would teach the quarterback to be aware of all options on the field at all times, to optimize time to release, and to increase comfort level in distributing the ball to players regardless of coverage as dictated by the electronic device controller.

It is an aspect of embodiments of the present invention to provide an apparatus to facilitate the increased peripheral awareness of a human and/or non-human subject.

It is another aspect of embodiments of the present invention to aid in decreasing the time to respond (decision making) thus increasing efficiency of execution.

It is a further aspect of embodiments of the present invention to increase confidence in abilities by acting on non-impulse instruction from the electronic device controller, and by extension, for instance, a coach.

It is yet another aspect of embodiments of the present invention to provide an electronic device controller that evaluates skillsets and manipulates them over time.

It is an aspect of embodiments of the present invention to provide an apparatus, system and method that can be used in multiple environments including sports such as football, hockey, and soccer; dog training sports such as hunting and schutzhund; and military training such as war games, target practice, and enemy identification.

One particular embodiment of the present invention is an awareness system, comprising a first awareness vest having a receiver and at least one light, wherein the receiver is in electronic communication with the at least one light; a second awareness vest having a receiver and at least one light, wherein the receiver is in electronic communication with the at least one light; an electronic device having a transmitter in electronic communication with the receiver of the first awareness vest and the receiver of the second awareness vest, wherein the electronic device has a first input and a second input, wherein activation of the first input causes the transmitter to send a signal to the receiver of the first awareness vest to activate a light of the at least one light, and wherein activation of the second input causes the transmitter to send a signal to the receiver of the second awareness vest to activate a light of the at least one light.

In some embodiments, the system further comprises a sensor configured to track a spatial position of the first awareness vest and the second awareness vest in an area defined by a continuous border, the sensor in electronic communication with the receivers of the awareness vests. In various embodiments, when the sensor detects that the first awareness vest has traveled by a predetermined distance in the area, the sensor sends a signal to activate a light of the at least one light of the first awareness vest.

In some embodiments, the sensor is disposed on the first awareness vest. In various embodiments, when the sensor detects that the first awareness vest has traveled outside of the area, the sensor sends a signal to activate another light of the at least one light of the first awareness vest. In some embodiments, the vest has a front portion and a back portion, wherein a first light is positioned on the front portion and a second light is positioned on the back portion.

Another particular embodiment of the present invention is a system for activating an awareness article, comprising a plurality of awareness articles, wherein each awareness article comprises a receiver and a light, and each receiver is in electronic communication with each respective light; and an electronic device having a transmitter configured to be in wireless electronic communication with the receiver of each awareness article of the plurality of awareness articles, and the electronic device having an input for each awareness article of the plurality of awareness articles, wherein activation of an input for a selected awareness article of the plurality of awareness articles causes the transmitter to send a signal to the receiver of the selected awareness article to activate the light on the selected awareness article.

In some embodiments, the system further comprises an area defined by a continuous border; a mark point within the area, wherein a light of a proximate awareness article of the plurality of awareness articles activates when the proximate awareness article is within a predetermined distance of the mark point. In various embodiments, each awareness article comprises a second light in electronic communication with each respective receiver, and wherein the electronic device has a second input for each awareness article, wherein activation of the second input of a selected awareness article causes the transmitter to send a second signal to the receiver of the selected awareness article to activate the second light on the selected awareness article. In some embodiments, the system further comprises an area defined by a continuous border, wherein when a remote awareness article of the plurality of awareness articles is positioned outside of the area, the transmitter of the electronic device transmits a signal to the remote awareness article to activate the second light on the remote awareness article.

In various embodiments, after a predetermined time, the transmitter of the electronic device sends a signal to a predetermined awareness article of the plurality of awareness articles, and the receiver of the predetermined awareness article receives the signal and relays the signal to the light to activate the light. In some embodiments, the awareness article is a vest having a front portion and a back portion, wherein the light is positioned on the front portion and a second light is positioned on the back portion, wherein the light and the second light emit the same color light. In various embodiments, the signal causes the light to emit light constantly for a predetermined time.

In some embodiments, the signal causes the light to selectively emit light in an alternating pattern for a predetermined time. In various embodiments, the area is one of a football field, a soccer field, and a hockey rink. In some embodiments, the electronic device is one of a mobile phone, a tablet computer, and a notebook computer.

Yet another specific embodiment of the present invention is a method of activating an awareness article, comprising providing a plurality of awareness articles, wherein each awareness article comprises a receiver and a light, and each receiver is in electronic communication with each respective light; providing an electronic device having a transmitter configured to be in wireless electronic communication with the receiver of each awareness article of the plurality of awareness articles, and the electronic device having an input for each awareness article of the plurality of awareness articles; activating the input on the electronic device for a selected awareness article; and transmitting a signal from the transmitter of the electronic device to the receiver of the selected awareness article to activate the light of the selected awareness article.

In some embodiments, the method further comprises positioning a proximate awareness article of the plurality of awareness articles within a predetermined distance of a mark point such that the transmitter of the electronic device emits a signal to the receiver of the proximate awareness article to activate the light of the proximate awareness article. In various embodiments, the electronic device has a second input that corresponds to a second light on each awareness article of the plurality of awareness articles. In some embodiments, the awareness article is a vest having a front portion and a back portion, wherein the light is positioned on the front portion and a second light is positioned on the back portion, wherein the light and the second light emit the same color light.

These and other advantages will be apparent from the disclosure of the invention(s) contained herein. The above-described embodiments, objectives, and configurations are neither complete nor exhaustive. The Summary of the Invention is neither intended nor should it be construed as being representative of the full extent and scope of the invention. Moreover, references made herein to "the invention" or aspects thereof should be understood to mean certain embodiments of the invention and should not necessarily be construed as limiting all embodiments to a particular description. The invention is set forth in various levels of detail in the Summary of the Invention as well as in the attached drawings and Detailed Description and no limitation as to the scope of the invention is intended by either the inclusion or non-inclusion of elements, components, etc. in this Summary of the Invention. Additional aspects of the invention will become more readily apparent from the Detailed Description particularly when taken together with the drawings.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, and may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Figure 1:
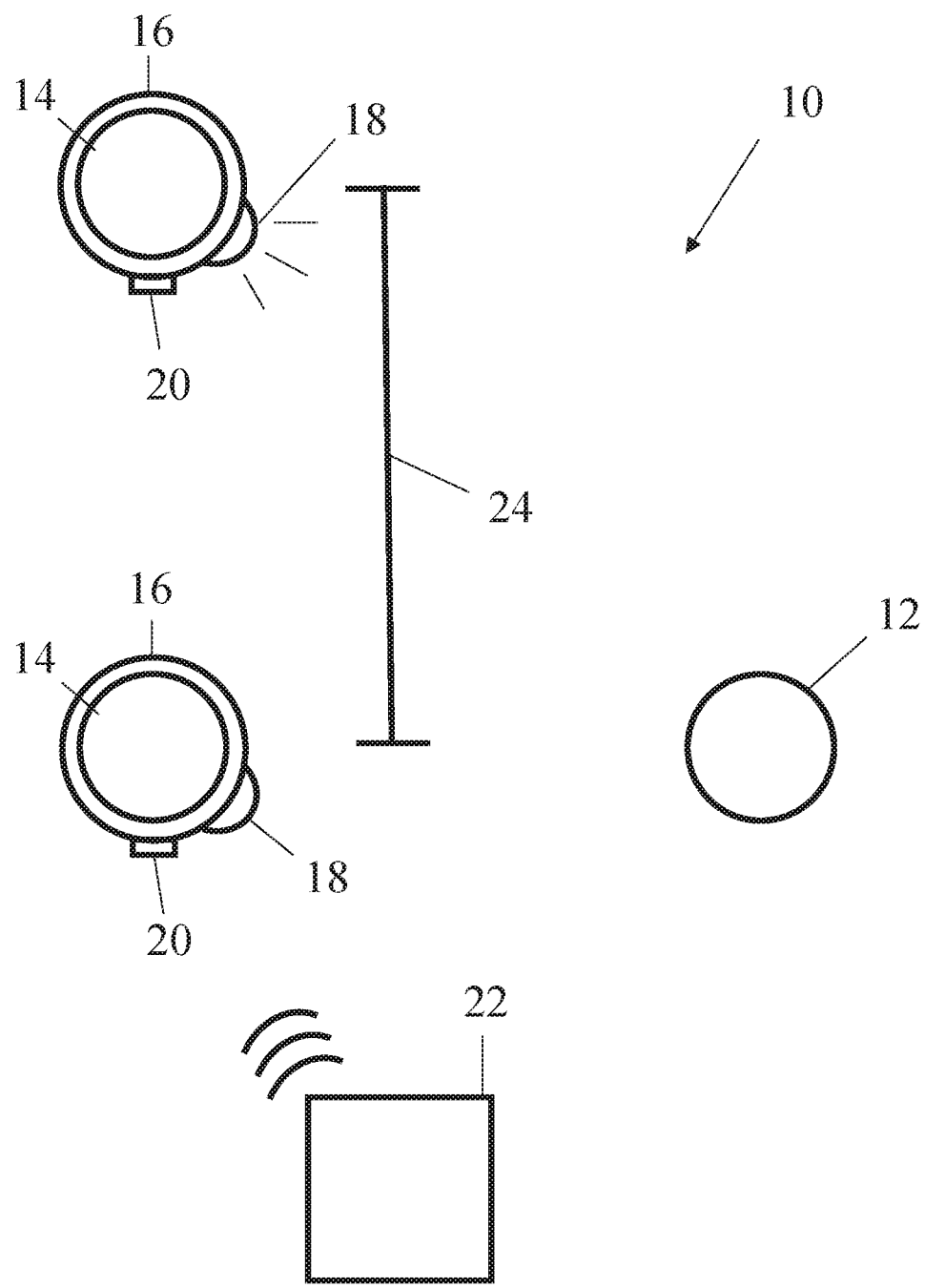
FIG. 1 is a top plan view of an awareness system according to one embodiment of the invention.

Now referring to FIG. 1, a top plan view of an awareness system 10 is provided. The system 10 generally comprises a first subject 12 and a second subject 14. In this embodiment, the first subject 12 is a quarterback, and the second subject 14 is a wide receiver. The second subject 14 is wearing an awareness vest 16 that has at least one light 18 that is in electronic communication with a receiver, or transceiver 20.

The transceiver 20 is in electronic communication with an electronic device 22, which provides a command to the transceiver 20 to activate the at least one light 18. The electronic communication link can be, for instance, Bluetooth technology, short wave radio frequency, etc. The electronic device 22 can monitor various aspects of the wide receiver 14 and the awareness vest 16, such as spatial position, which can be based on sensors in the awareness vest 16 or sensors in another location. In some embodiments, the device 22 can provide, for example, a pre-programmed routine so that the at least one light 18 turns on when the awareness vest 16 and wide receiver 14 are in the desired spatial position. It will be appreciated that the device 22 could also be a mobile electronic device (mobile phone, tablet, personal computer, or the like), and a coach provides a manual input to the device 22 to cause activation of the at least one light 18. The mobile electronic device may be capable of viewing all active vests with the embedded light array. It will be further appreciated that the device 22 can be remote from either subject 12, 14 or placed on one of the subjects 12, 14 such as the awareness vest 16 of the wide receiver 14 and/or integrated with the light 18 so that a transceiver 20 is not needed.

In the depicted embodiment, the quarterback 12 is seeking to improve the timing of a pass to the wide receiver 14. Therefore, in this embodiment, the operation of the awareness system 10 is based on the spatial position of the wide receiver 14. In a first position, the wide receiver 14 is in place waiting for the play to begin. In a second position, the wide receiver 14 has run downfield by a predetermined distance 24, which causes the device 22 to send a signal to the transceiver 20 of the awareness vest 16, which then causes the activation of the at least one light 18. As the at least one light 18 turns on, the quarterback 12 executes a throw to the wide receiver 14. Thus, the quarterback 12 is training to time his throw to the wide receiver 14 at a predetermined distance 24 downfield.

There may be an event, threshold, etc. that triggers the light 18 other than the position of the awareness vest 16 in space. For example, velocity and acceleration can be used as triggers, and further, the vertical dimension of these characteristics can be used to trigger the light 18. Further still, other triggers such as an audible signal, a thermal threshold or gradient can be incorporated.

Next, once triggered, the light 18 can have more functionality that being on or off. For instance, referring back to the football scenario, when the wide receiver 14 travels the predetermined distance 24, the awareness vest 16 may display a light having a first color to signal the quarterback to begin the windup process of a throw, and then display a light having a second color after a predetermined time period to signal when the quarterback should release the throw.

In addition, it will be appreciated that there may be more than one awareness vest 16 in a given system 10, and the relative distance between vests 16 and subjects can influence whether a light 18 is turned on, what type of light 18 color or pattern is displayed, etc. It will be appreciated that the vests may be designed to fit human subjects, animals, inanimate objects and so on.

Figure 2:
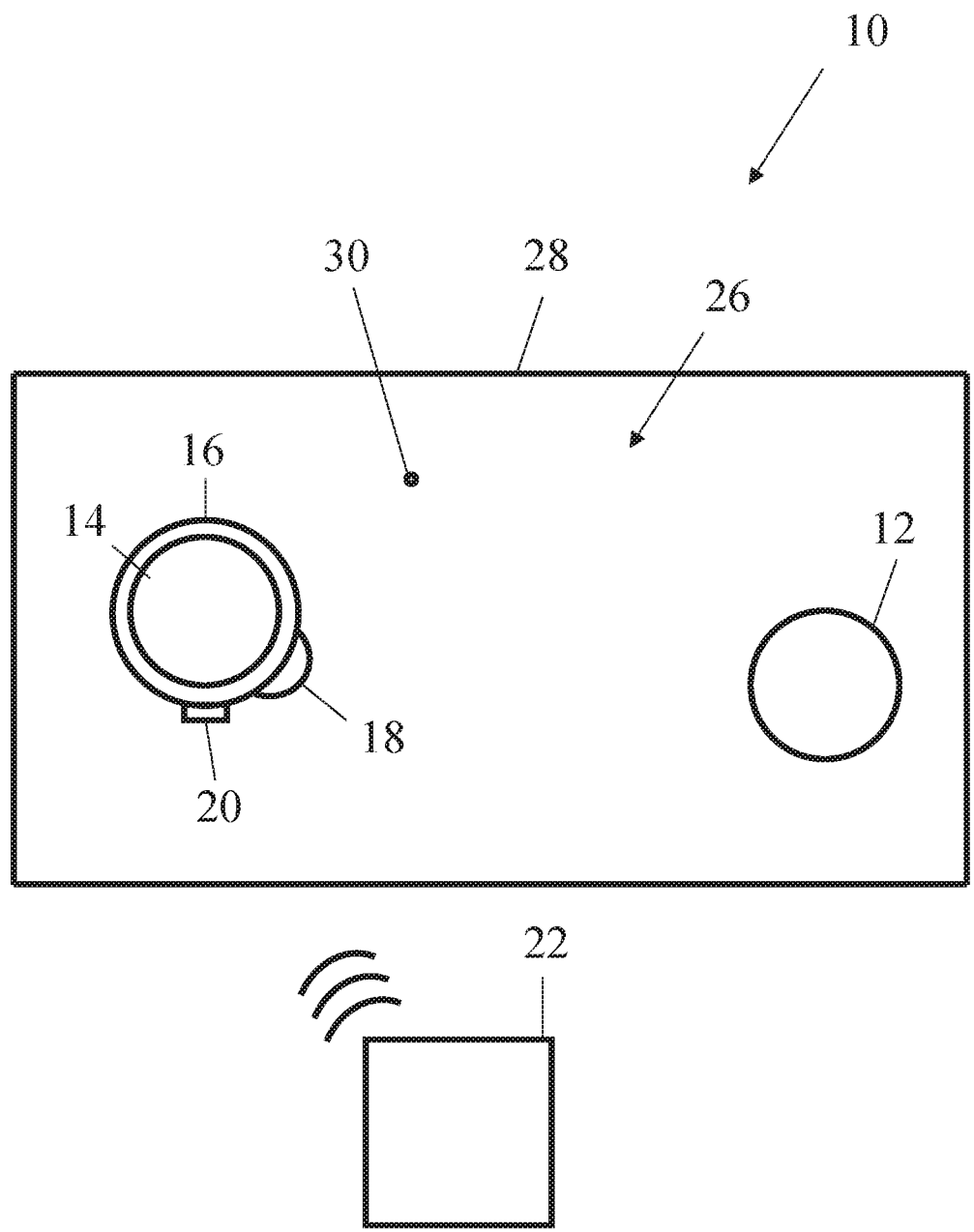
FIG. 2 is a top plan view of a further awareness system according to one embodiment of the invention.

Now referring to FIG. 2, a top plan view of another awareness system 10 is provided. In this embodiment, the first subject 12 and the second subject 14 are positioned within an area 26 that is defined by a continuous border. This area 26 can be, for example, a football field, a soccer field, a hockey rink, or any other defined area for any application. Here, various events can cause the triggering of one or more lights on the awareness vest or article 16. For example, the second subject 14 can travel outside of the area 26, which can cause a light 18 to activate on the awareness article 16. A sensor on the awareness article 16 can determine when the second subject 14 has traveled outside of the area, and the sensor can automatically activate the light 18. In other embodiments, a remote sensor can track the position of the second subject 14 and then send a signal directly to the awareness article 16 or via the electronic device 22. In various embodiments, when a second subject 14 moves outside of the area 26 a second light can emit a light with a different color. In the context of football, when a receiver 14 steps out of bounds, or out of the area 26, a red light on the awareness vest 16 can be activated to let the first subject 12 or quarterback know that the wide receiver 14 is ineligible to catch a pass. Similarly, sub areas can be defined within the area 26 such that when a receiver 14 is in a less desirable sub area, an orange light on the awareness article 16 can be emitted.

Next, a mark point 30 can be defined within the area 26. The mark point 30 can represent an ideal point for a receiver 14 to run through, etc. When the receiver 14 is near or on the mark point 30, a light 18 on the awareness device 16 can be activated. For example, if a wide receiver 14 is within a predetermined distance of the mark point 30, a light 18 on the awareness device 16 can be activated. Multiple lights can help a quarterback 12. For instance, as the wide receiver 14 gets closer to the mark point 30 within a first predetermined distance, a first light 18 on the awareness article 16 can emit a first color. Then, as the wide receiver 14 gets even closer, within a second predetermined distance, or on the mark point 30, a second light on the awareness article 16 can emit a second color. It will be appreciated that a single light 18 can emit the one or more colors recited herein.

Figure 3:
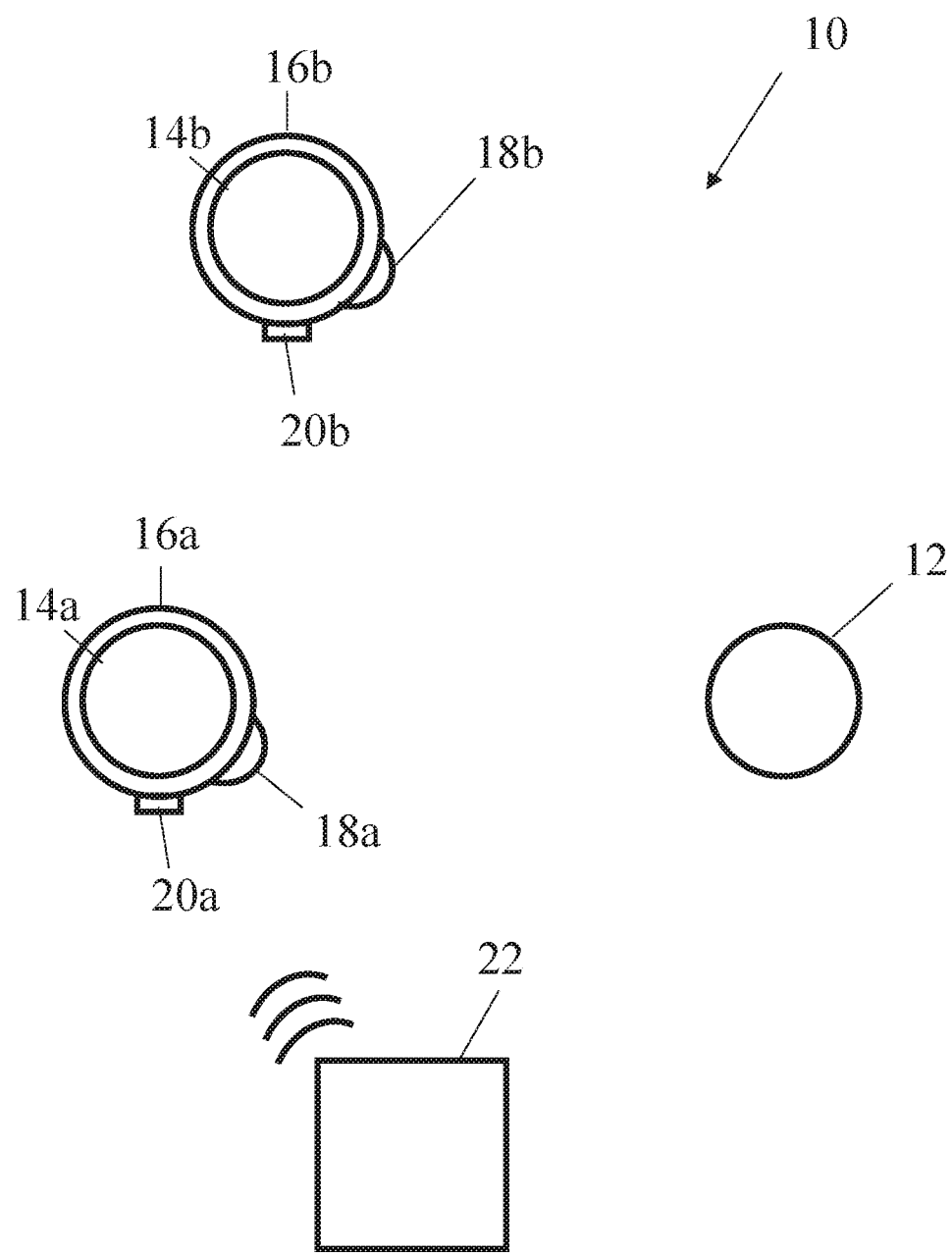
FIG. 3 is a top plan view of yet another awareness system according to one embodiment of the invention.

Now referring to FIG. 3, a top plan view of yet another awareness system 10 is provided. In this embodiment, a plurality of second subjects 14a, 14b have respective awareness articles 16a, 16b in electronic communication with an electronic device 22. For instance, during a football game, each player can have an awareness vest 16, and a coach can control the activation of a light on each awareness vest 16.

The electronic device as described herein can comprise a display unit such as a touch screen. Thus, a first input or second input would refer to a portion of a touch screen. Alternatively, the electronic device can have inputs that refer to buttons that are physically displaced to activate the selected button and input. To aid with the enablement and written description requirements, U.S. Pat. No. 9,262,002 is incorporated by reference in its entirety to further describe a touch screen; U.S. Pat. No. 8,626,084 is incorporated by reference in its entirety to further describe a transceiver; U.S. Pat. No. 8,432,260 is incorporated by reference in its entirety to further describe a near field communications; and U.S. Publication Nos. 2012/0260397; 2012/0300435; 2011/0215086; 2014/0268685; and 2014/0078773 are incorporated by reference in their entirety to further describe vests.

The invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed.

The phrases "at least one", "one or more", and "and/or", as used herein, are open-ended expressions that are both conjunctive and disjunctive in operation. For example, each of the expressions "at least one of A, B, and C", "at least one of A, B, or C", "one or more of A, B, and C", "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification, drawings, and claims are to be understood as being modified in all instances by the term "about."

The term "a" or "an" entity, as used herein, refers to one or more of that entity. As such, the terms "a" (or "an"), "one or more" and "at least one" can be used interchangeably herein.

The use of "including," "comprising," or "having," and variations thereof, is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts, and the equivalents thereof, shall include all those described in the summary of the invention, brief description of the drawings, detailed description, abstract, and claims themselves.

The foregoing description of the invention has been presented for illustration and description purposes. However, the description is not intended to limit the invention to only the forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Consequently, variations and modifications commensurate with the above teachings and skill and knowledge of the relevant art are within the scope of the invention. The embodiments described herein above are further intended to explain best modes of practicing the invention and to enable others skilled in the art to utilize the invention in such a manner, or include other embodiments with various modifications as required by the particular application(s) or use(s) of the invention. Thus, it is intended that the claims be construed to include alternative embodiments to the extent permitted by the prior art.

What is claimed is:

1. An awareness system, comprising:
   a first awareness vest having a receiver and at least one light, wherein the receiver is in electronic communication with the at least one light;
   a second awareness vest having a receiver and at least one light, wherein the receiver is in electronic communication with the at least one light;
   an electronic device having a transmitter in electronic communication with the receiver of the first awareness vest and the receiver of the second awareness vest, wherein the electronic device has a first input and a second input, wherein activation of the first input causes the transmitter to send a signal to the receiver of the first awareness vest to activate a light of the at least one light, and wherein activation of the second input causes the transmitter to send a signal to the receiver of the second awareness vest to activate a light of the at least one light.

2. The awareness system of claim 1, further comprising:
   a sensor configured to track a spatial position of the first awareness vest and the second awareness vest in an area defined by a continuous border, the sensor in electronic communication with the receivers of the awareness vests.

3. The awareness system of claim 2, wherein when the sensor detects that the first awareness vest has traveled by a predetermined distance in the area, the sensor sends a signal to activate a light of the at least one light of the first awareness vest.

4. The awareness system of claim 1, wherein the sensor is disposed on the first awareness vest.

5. The awareness system of claim 1, wherein when the sensor detects that the first awareness vest has traveled outside of the area, the sensor sends a signal to activate another light of the at least one light of the first awareness vest.

6. The awareness system of claim 1, wherein the vest has a front portion and a back portion, wherein a first light is positioned on the front portion and a second light is positioned on the back portion.

7. A system for activating an awareness article, comprising:
   a plurality of awareness articles, wherein each awareness article comprises a receiver and a light, and each receiver is in electronic communication with each respective light; and
   an electronic device having a transmitter configured to be in wireless electronic communication with the receiver of each awareness article of the plurality of awareness articles, and the electronic device having an input for each awareness article of the plurality of awareness articles, wherein activation of an input for a selected awareness article of the plurality of awareness articles causes the transmitter to send a signal to the receiver of the selected awareness article to activate the light on the selected awareness article;
   wherein each awareness article comprises a second light in electronic communication with each respective receiver, and wherein the electronic device has a second input for each awareness article, wherein activation of the second input of a selected awareness article causes the transmitter to send a second signal to the receiver of the selected awareness article to activate the second light on the selected awareness article.

8. The system of claim 7, further comprising:
an area defined by a continuous border;
a mark point within the area, wherein a light of a proximate awareness article of the plurality of awareness articles activates when the proximate awareness article is within a predetermined distance of the mark point.

9. The system of claim 7, further comprising:
an area defined by a continuous border, wherein when a remote awareness article of the plurality of awareness articles is positioned outside of the area, the transmitter of the electronic device transmits a signal to the remote awareness article to activate the second light on the remote awareness article.

10. The system of claim 9, wherein the area is one of a football field, a soccer field, and a hockey rink.

11. The system of claim 7, wherein after a predetermined time, the transmitter of the electronic device sends a signal to a predetermined awareness article of the plurality of awareness articles, and the receiver of the predetermined awareness article receives the signal and relays the signal to the light to activate the light.

12. The system of claim 7, wherein the awareness article is a vest having a front portion and a back portion, wherein the light is positioned on the front portion and a second light is positioned on the back portion, wherein the light and the second light emit the same color light.

13. The system of claim 7, wherein the signal causes the light to emit light constantly for a predetermined time.

14. The system of claim 7, wherein the signal causes the light to selectively emit light in an alternating pattern for a predetermined time.

15. The system of claim 7, wherein the electronic device is one of a mobile phone, a tablet computer, and a notebook computer.

16. A method of activating an awareness article, comprising:
providing a plurality of awareness articles, wherein each awareness article comprises a receiver and a light, and each receiver is in electronic communication with each respective light;
providing an electronic device having a transmitter configured to be in wireless electronic communication with the receiver of each awareness article of the plurality of awareness articles, and the electronic device having an input for each awareness article of the plurality of awareness articles;
activating the input on the electronic device for a selected awareness article;
transmitting a signal from the transmitter of the electronic device to the receiver of the selected awareness article to activate the light of the selected awareness article; and
positioning a proximate awareness article of the plurality of awareness articles within a predetermined distance of a mark point such that the transmitter of the electronic device emits a signal to the receiver of the proximate awareness article to activate the light of the proximate awareness article.

17. The method of claim 16, wherein the electronic device has a second input that corresponds to a second light on each awareness article of the plurality of awareness articles.

18. The method of claim 16, wherein the awareness article is a vest having a front portion and a back portion, wherein the light is positioned on the front portion and a second light is positioned on the back portion, wherein the light and the second light emit the same color light.

* * * * *